United States Patent [19]

Martin

[11] 4,325,528
[45] Apr. 20, 1982

[54] BRACKET MOUNTING

[76] Inventor: Jack T. Martin, 85 Leonard Ave., Washington, Pa. 15301

[21] Appl. No.: 130,011

[22] Filed: Mar. 13, 1980

[51] Int. Cl.³ .................. F16M 13/00; E04G 5/06
[52] U.S. Cl. ............................. 248/217.2; 248/546
[58] Field of Search ............... 248/546, 216.1, 216.4, 248/217.1, 217.2, 217.3

[56] References Cited

U.S. PATENT DOCUMENTS

| 833,697 | 10/1906 | Riefsnyder | 248/217.2 |
| 857,829 | 6/1907 | McGregor | 248/217.1 |

FOREIGN PATENT DOCUMENTS 37392  7/1923  Norway ........................... 248/217.2

Primary Examiner—Doris L. Troutman
Attorney, Agent, or Firm—William J. Ruano

[57] ABSTRACT

A wall bracket having mounting means integrally formed or fastened thereon in the form of an angle shaped extension with a pointed end for piercing into the surface of a sidewall so that by piercing the pointed end through the sidewall and pulling the bracket downwardly 90°, it is firmly mounted on the sidewall without the necessity of screws or other fastening means.

4 Claims, 6 Drawing Figures

BRACKET MOUNTING

This invention is an improvement over my pending application Ser. No. 069,318 filed Aug. 24, 1979.

A disadvantage of the bracket shown in my copending application is that it was confined to mounting at the place where the sidewall met the ceiling or some other horizontally extending portion, therefore, limited the location of the bracket unnecessarily.

An object of the present invention is to overcome the above-named disadvantage by so shaping the mounting portion of the bracket so as to enable it to be mounted along any height desired of the sidewall, thereby providing greater flexibility of use of the bracket.

Other objects and advantages of the invention will become more apparent from a study of the following description wherein.

Figure 1:
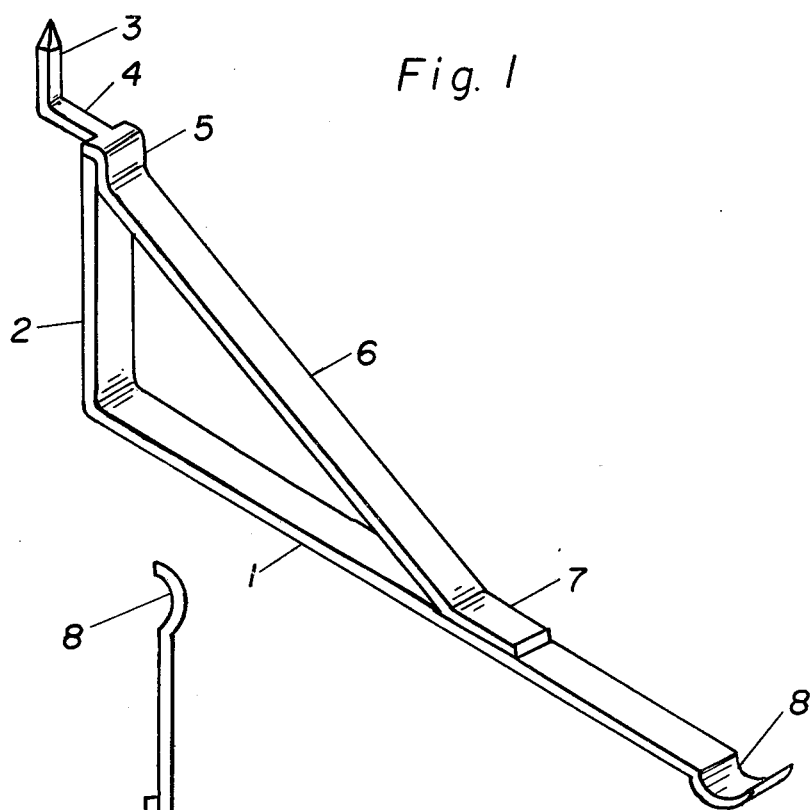
FIG. 1 is a side perspective view showing my novel bracket.

Referring more particularly to FIG. 1 of the drawing, numeral 1 denotes a horizontally extending portion and numeral 2 a vertically extending portion of a bracket embodying the present invention. The bracket may be made of wrought iron, steel or other suitable material. A brace portion 6 of the bracket has one end 7 welded or otherwise securely fastened to portion 1 and has a shoulder portion 5 at the other end from which extends an angled extremity comprising a horizontally extending portion 4 and a vertically extending portion 3 having a pointed end which can be pierced into the sidewall.

Figure 2:
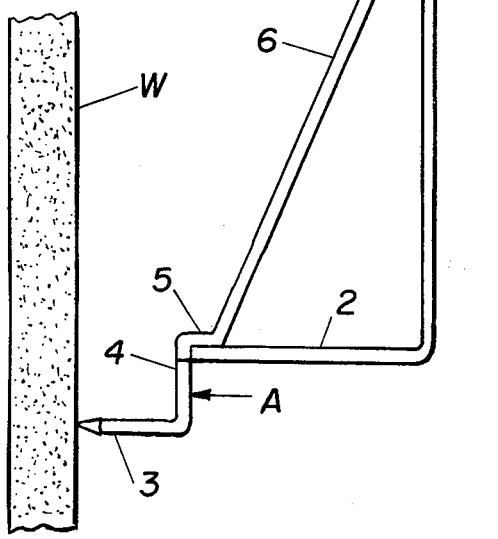
FIG. 2 is a side view of the first step in the operation of mounting the bracket of FIG. 1 on a sidewall.
Figure 3:
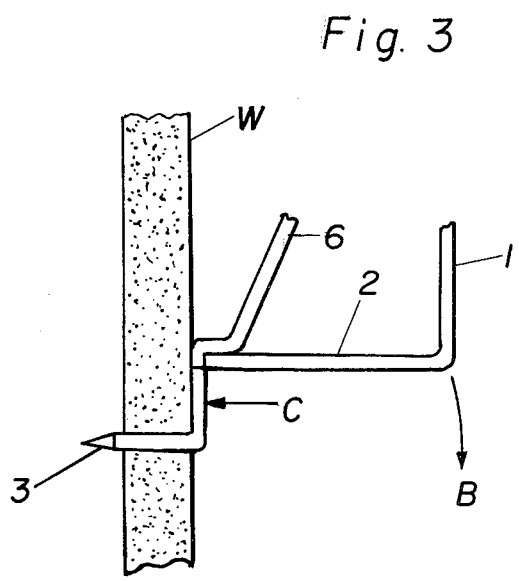
FIG. 3 shows the second step in mounting the bracket on the sidewall.
Figure 4:
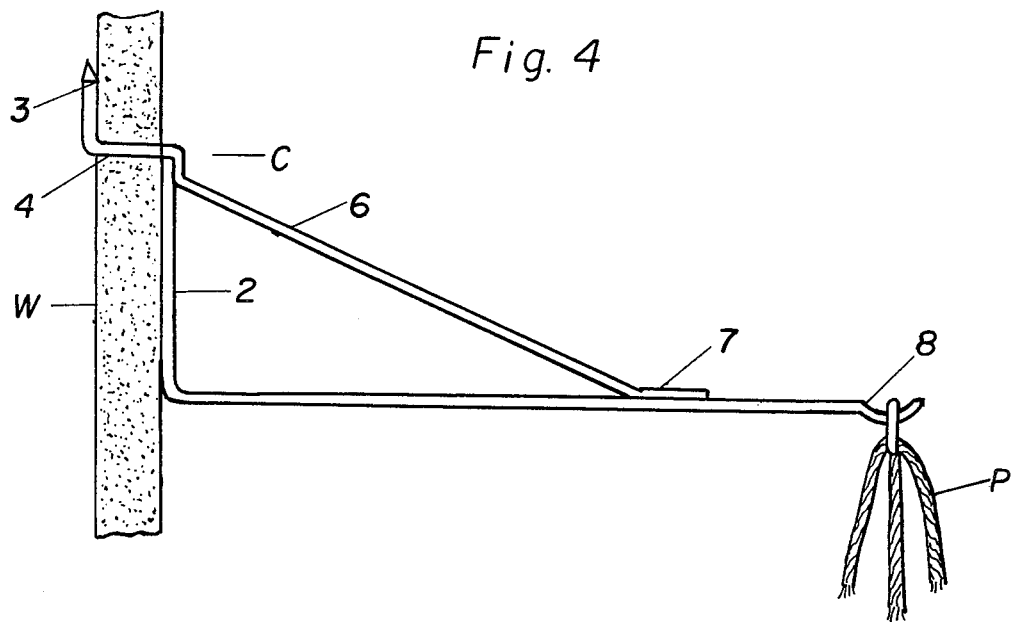
FIG. 4 shows the third and final step of mounting the bracket on a sidewall.

In operation and referring to FIG. 2 which shows the first step in the operation of mounting the bracket onto the sidewall W, the arrows labeled A show where the angled portion 4,3 is to be tapped to facilitate piercing through the entire thickness of the sidewall W, that is, until the position shown in FIG. 3 is achieved. Thence, by grasping the end portion 8 and moving downwardly in the direction shown by arrows B, the bracket angle portion 3,4 will be turned clockwise 90° and tapped at shoulder portion 5 into the final position shown in FIG. 4, whereby the horizontal portion 1 extends at right angles to the wall W. On end 8 there is supported any desired object, such as a hanging basket P, only a fragmentary portion of which is shown.

It will be understood, that other items, such as a clothes hanger or other suspended item may be supported instead on the end portion 8. Also the bracket itself may be of other shapes. Moreover, instead of an angle portion 3,4 an arcuate shaped piece may be used.

Figure 5:
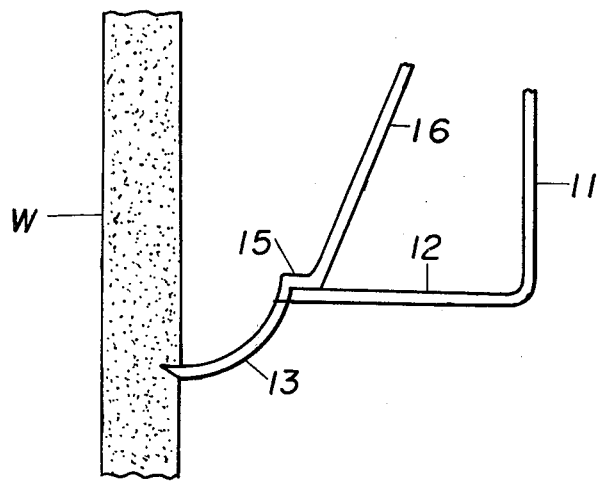
Figure 6:
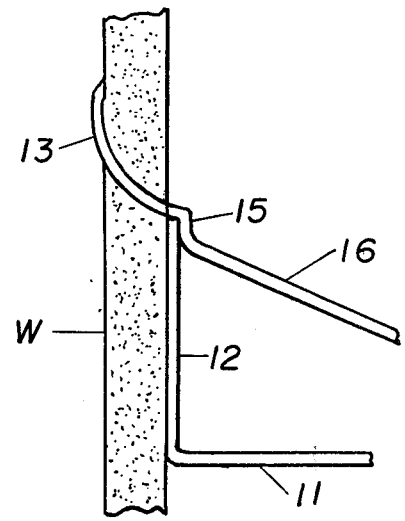

To remove the hanger from the wall W, the reverse movements are effected, that is, lifting portion 1 to the position shown in FIG. 3, thence FIG. 2. FIGS. 5 and 6 show a modification wherein an arcuate portion 13 is used instead of the angle 4,3 in order to effect less gouging of the wall material. Portions 11,12, 15 and 16 correspond to portions 1,2,5 and 6 in FIG. 1.

In operation, when the bracket is in the position shown in FIG. 5, the arcuate portion is horizontally tapped, even as the portion 11 is turned downwardly until the bracket attains the position shown in FIG. 6. To remove the bracket, it is lifted upwardly.

Thus, it will be seen that I have provided a highly efficient wall bracket that can be easily and quickly installed on any area of a sidewall simply by pushing the pointed end through the thickness of the sidewall and then pulling down through an angle of 90°. Such mounting is done without the necessity of screws, bolts or other fastening means.

While I have illustrated and described several embodiments of my invention, it will be understood that they are by way of illustration only and that various changes and modifications may be contemplated in my invention and within the scope of the following claims.

I claim:

1. A wall bracket of substantially right triangular shape comprising a horizontally extending base portion, a vertically extending portion of substantially smaller length and adapted to lean against a sidewall, and a brace portion forming the hypotenuse of the right triangular shape, and an extension which extends horizontally and vertically from the top of said vertically extending portion, said extension terminating in a point to enable penetrating a wall while said base portion is held vertically and thereafter pulling on the end of said base portion and rotating said bracket 90°.

2. A wall bracket as recited in claim 1 wherein said extension is a horizontally extending portion of the end of said brace portion of a length corresponding to the thickness of the wall on which said bracket is to be mounted, said horizontally extending portion terminating with a vertically extending portion having a pointed end.

3. A wall bracket as recited in claim 1 wherein said extension is of arcuate shape so that portion of said arcuate shape extends through the thickness of the wall on which said bracket is to be mounted and the pointed end will rest against the rear surface of the wall.

4. The bracket recited in claim 2 wherein said horizontally extending portion of said extension is integral with a shoulder portion of said brace portion, and wherein said base portion terminates with a hook shape end to support objects.

* * * * *